July 13, 1965  F. STRIEPE  3,194,120
SPLINE SHAFT PLANER
Filed April 24, 1963 7 Sheets-Sheet 1

Inventor:
FRIEDRICH STRIEPE
by: Albert W Zalkind

July 13, 1965

F. STRIEPE 3,194,120

SPLINE SHAFT PLANER

Filed April 24, 1963

Inventor:

July 13, 1965  F. STRIEPE  3,194,120
SPLINE SHAFT PLANER
Filed April 24, 1963  7 Sheets-Sheet 3

Inventor:

July 13, 1965 F. STRIEPE 3,194,120
SPLINE SHAFT PLANER
Filed April 24, 1963 7 Sheets-Sheet 5

July 13, 1965     F. STRIEPE     3,194,120
SPLINE SHAFT PLANER

Filed April 24, 1963     7 Sheets-Sheet 6

Inventor:

3,194,120
SPLINE SHAFT PLANER
Friedrich Striepe, Friedrichshafen, Germany, assignor to Zahnradfabrik Friedrichshafen Aktiengesellschaft, Friedrichshafen, Germany
Filed Apr. 24, 1963, Ser. No. 275,385
Claims priority, application Germany, Apr. 25, 1962, Z 9,375
19 Claims. (Cl. 90—2)

This invention relates to planing machines for splining shafts or making gears and equivalent machine components.

It is an object of the present invention to provide a machine of considerable adaptability for either cutting splines or gears wherein the cutters can follow a straight and a curvilinear path. Thus, the invention effects an improvement over prior art machines which can cut either linearly or curvilinearly, but not both in the same machine. For example, in splining a shaft, the end of the groove is brought up to the shaft surface along a curved and gradual manner.

Another object of the invention is to provide a planer which can simultaneously cut a series of grooves in splining a shaft or forming a gear.

Other objects and features of the invention will be apparent as the disclosure is developed herein.

In machines of the type under discussion, where splining of shafts is accomplished, a circular milling cutter is normally used, since this leaves a curved end on each slot which is necessary in order to be able to subsequently grind the slot with a rotary grinding disc. However, such mode of splining is slow and requires the cutting of one slot at a time. The present invention provides a machine which is considerably faster, in that all slots are cut simultaneously and yet are curved at their terminal points so that they can be subsequently ground by a rotary disc.

Briefly, the invention comprises a headstock and tailstock for support of a shaft or other workpiece to be machined wherein a radial array of cutters is disposed to surround the stock and to move longitudinally with respect thereto.

The construction comprises a planer or cutter head which carries the cutters and which is movably mounted so that it can move radially with respect to the work under the control of the template following rollers. A pair of templates are provided which simultaneously control all cutters and wherein the templates are automatically moved a certain amount after each cut, in order to position the cutters for the next succeeding cut.

The construction for mounting the templates is such that they are translated by means of a parallel linkage to a diminishing extent with each cut, so that the feed at each succeeding cut is a little less than that on the preceding cut. As the length of the flank portions of the cut increases as the cutter progresses deeper, it is achieved by such an arrangement that the overall chip section and as a result the cutting effort remains substantially constant at all cuts. This is accomplished by means of the parallel crank linkage operating on the templates and so disposed that, as the links pivot, the amount of horizontal movement of the templates toward the work is progressively lessened as determined by the angle which the links make with the direction of movement of the templates.

As the cutters follow the curvilinear end of their path, for example in splining, the cutting angle δ differs from that on the linear path, but this does not bring about any serious shortening of the lives of the cutters, as the cutters, following a tool back-out curve in coming out of the work, cut a chip of cuneiform cross-section, as set forth more in detail at the end of the description.

A detailed description of the invention now follows in conjunction with the appended drawing in which.

Figure 1:
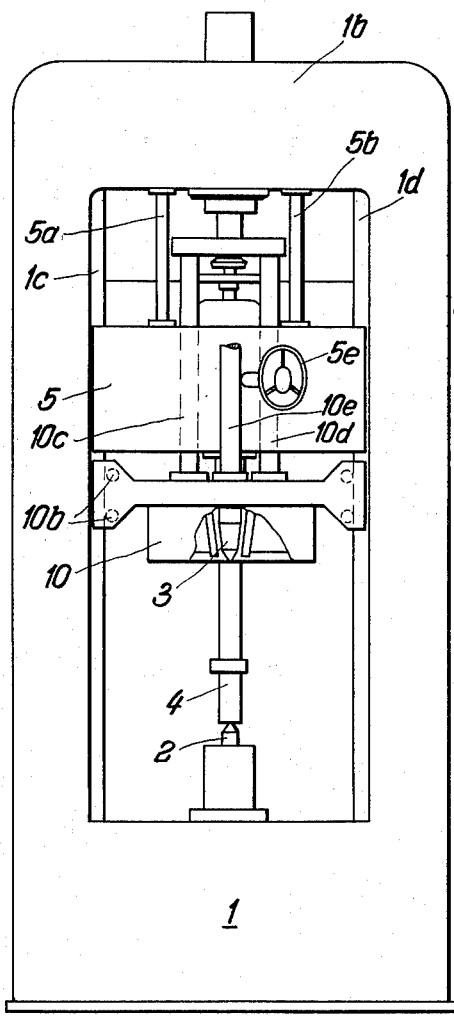
FIG. 1 is a front elevation of a machine embodying the principles of the invention.
Figure 2:
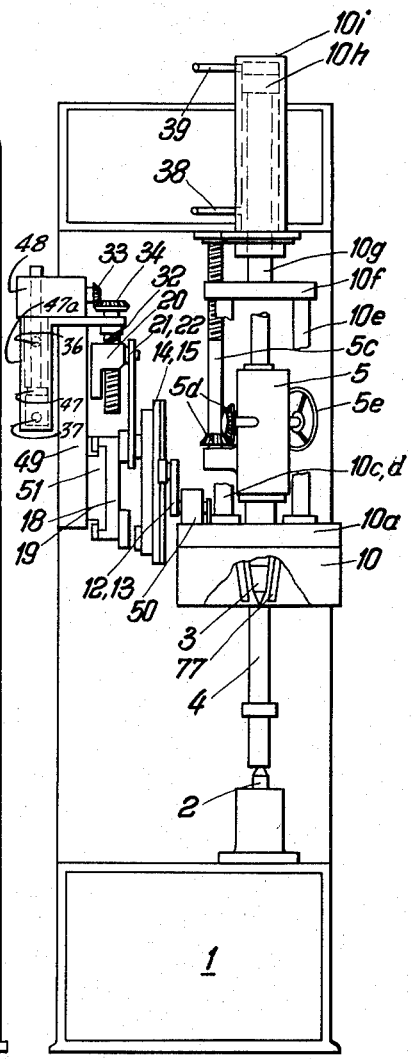
FIG. 2 is an elevation taken at right angles to FIG. 1 partially in section.

Referring now to FIGS. 1 and 2, the invention comprises a frame 1 wherein is supported a head stock 3 and a tailstock 2, between which a workpiece 4 is carried in a conventional manner. It will be understood that the tailstock can be lowered in any conventional manner, for example, hydraulically, for workpiece removal and replacement. The headstock is carried in a vertical movable carrier 5 through which two rods 5a and 5b pass, and it will be understood that the carrier 5 may be adjusted on the rods in order to fit in various lengths of work. Such adjustment can be effected by means of a hand-wheel 5e operating beveled gears 5d for rotating a shaft 5c which is threaded into the machine frame crosspiece 1b. Thus, rotation of wheel 5e can raise or lower carrier 5, which may also be guided by the vertical rails 1c and 1d.

Figure 5:
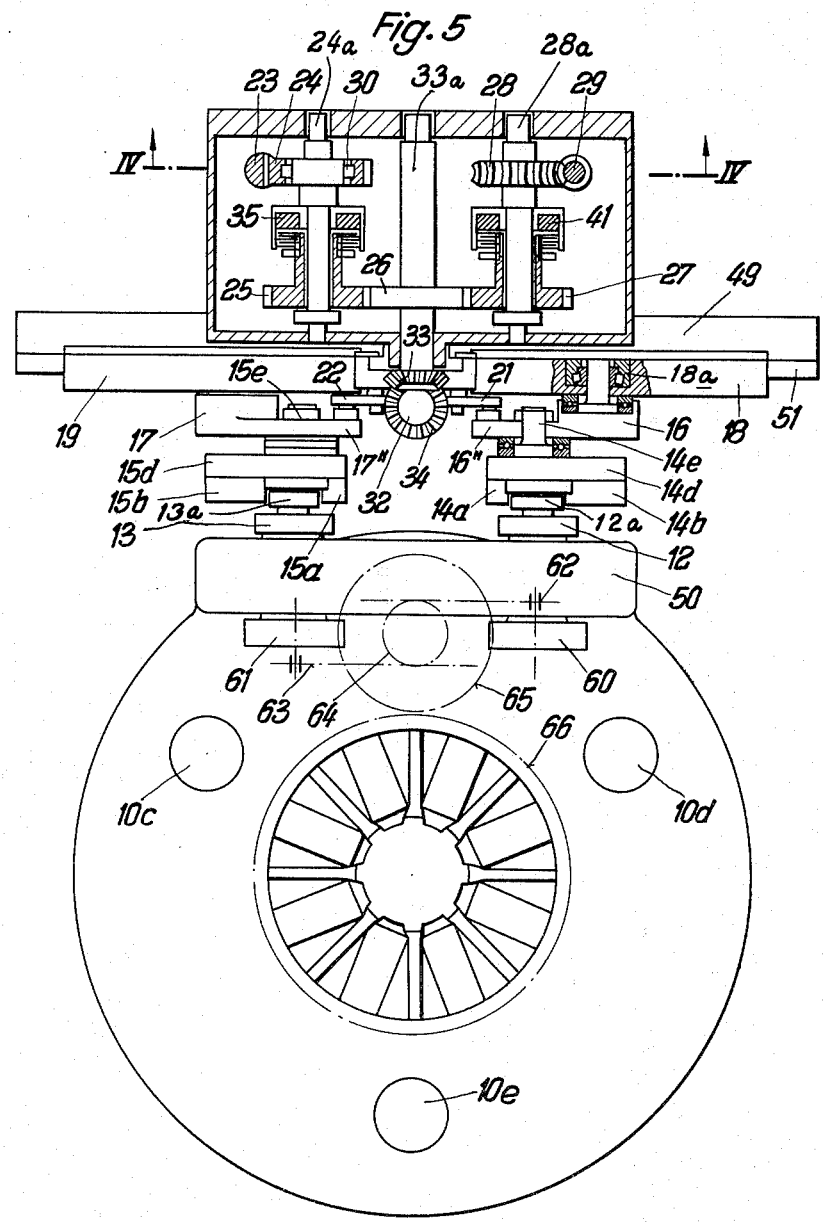
FIG. 5 is a plan view through V—V of FIG. 4 partially in section.

A cutter head 10 is provided carried by a plate 10a having rollers 10b and 10k (FIGURE 3) guided by means of the rails 1c and 1d and being secured by a plate 10f and rods 10c, 10d and 10e to a piston rod 10g (also see FIG. 5). Piston rod 10g connects to a piston 10h which drives the cutter head and is reversibly movable under oil pressure in the cylinder 10i mounted in crosspiece 1b of the machine frame. Thus, the head 10 is movable upwardly or downwardly by means of the hydraulic piston arrangement and in this manner the planer knives or cutters 77 are moved longitudinally with respect to the workpiece to effect cutting.

The head 10 has a plate 10a (FIG. 6) on which a linearly movable bearing block 50 is mounted. Such bearing block can reciprocate left or right with respect to FIG. 6 on rollers 50a and is secured to plate 10a by means of bolts 57 which pass through slot-like holes 58 and screw into plate 10a. A plate 10m maintains alignment of the bolts, such bolts passing through bores therein, as shown.

Figure 3:
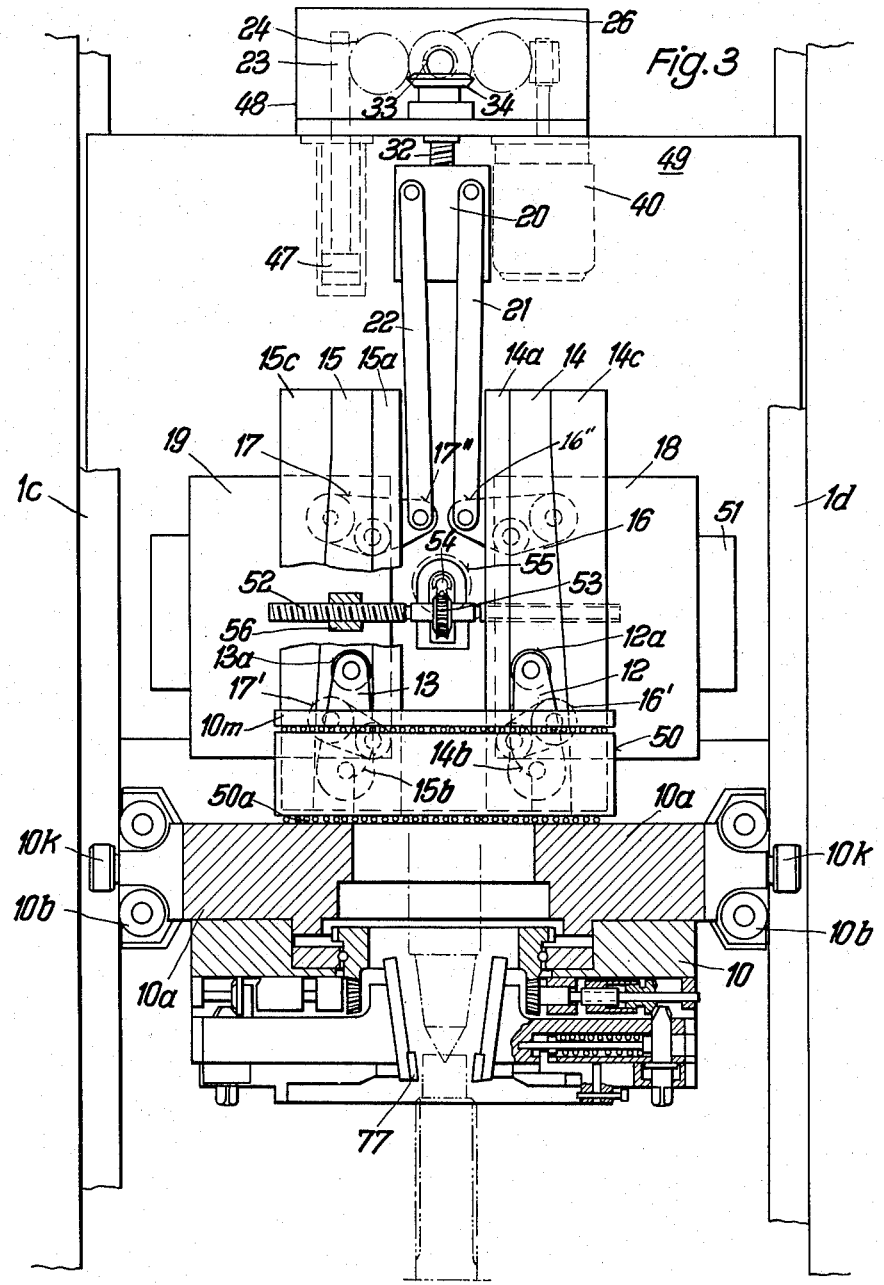
FIG. 3 is an elevation of a portion of the machine to an amplified scale, viewed in the same direction as FIG. 1, and showing details of the planer head and the cutter support structure.

Block 50 carries pivotally (FIGS. 5 and 6) the template feeler levers 12 and 13 which have template engaging rollers 12a and 13a, respectively, all as shown in FIGS. 2, 3 and 5–8, and wherein the rollers engage respective templates 14 and 15. Thus, as illustrated in FIGS. 3 and 5, roller 12a engages the edges 14a, 14b and 14f (see also FIG. 8) of template 14 on the down stroke of cutters 77, and engages edge 14c on the up stroke, reference being made to FIG. 5 to show how the rollers are disposed intermediate the edges of the template guides. Likewise, roller 13a engages template edges 15a, 15b, 15c and 15f. The curvilinear edges 14b and 15b are circular arcs having the radius R.

Referring to FIGS. 3 and 5, the templates 14 and 15 will be seen to be carried each on its own parallel linkage system. Thus, template 14 which comprises spaced guides 14a and 14c is carried on translational motion guide means comprising a pair of links 16 and 16', the upper of which, 16, is a bell crank lever. Similarly, the template 15 which has guides 15a and 15c are carried on links 17 and 17', link 17 being a bell crank lever. Thus, each pair of guides is carried on a respective plate, 14d and 15d, pivotally mounted by respective stub shafts 14e and 15e to the links 16 and 17, respectively.

As particularly noted in FIG. 5, the links are pivotally joined to respective plates 18 and 19 carried on a transverse bar 51 (also see FIG. 2) which is fixed to a vertical plate 49 which will be understood to be vertically adjustable, guided in frame guideways 1c and 1d for adjustment, as indicated in FIG. 3. The plates 18 and 19 have horizontal adjustability on the bar 51, but are otherwise fixed thereon, plate 18 being a template carrier, in that it supports template 14 via links 16 and 16', and plate 19 being in the same manner a template carrier for template 15 via links 17 and 17', all by pivotal connection at bearings such as 18a.

Plates 18 and 19 have an initial horizontal adjustment by threaded engagement with a screw 52 having left-hand and right-hand threading so that rotation thereof will simultaneously move the plates toward or away from each other. Thus, the templates are initially positioned with regard to the diameter of the workpiece. Rotation of screw 52 is effected by means of a hand-wheel 55 acting through a worm 54 meshing with a worm gear 53 keyed to screw 52.

Figure 4:
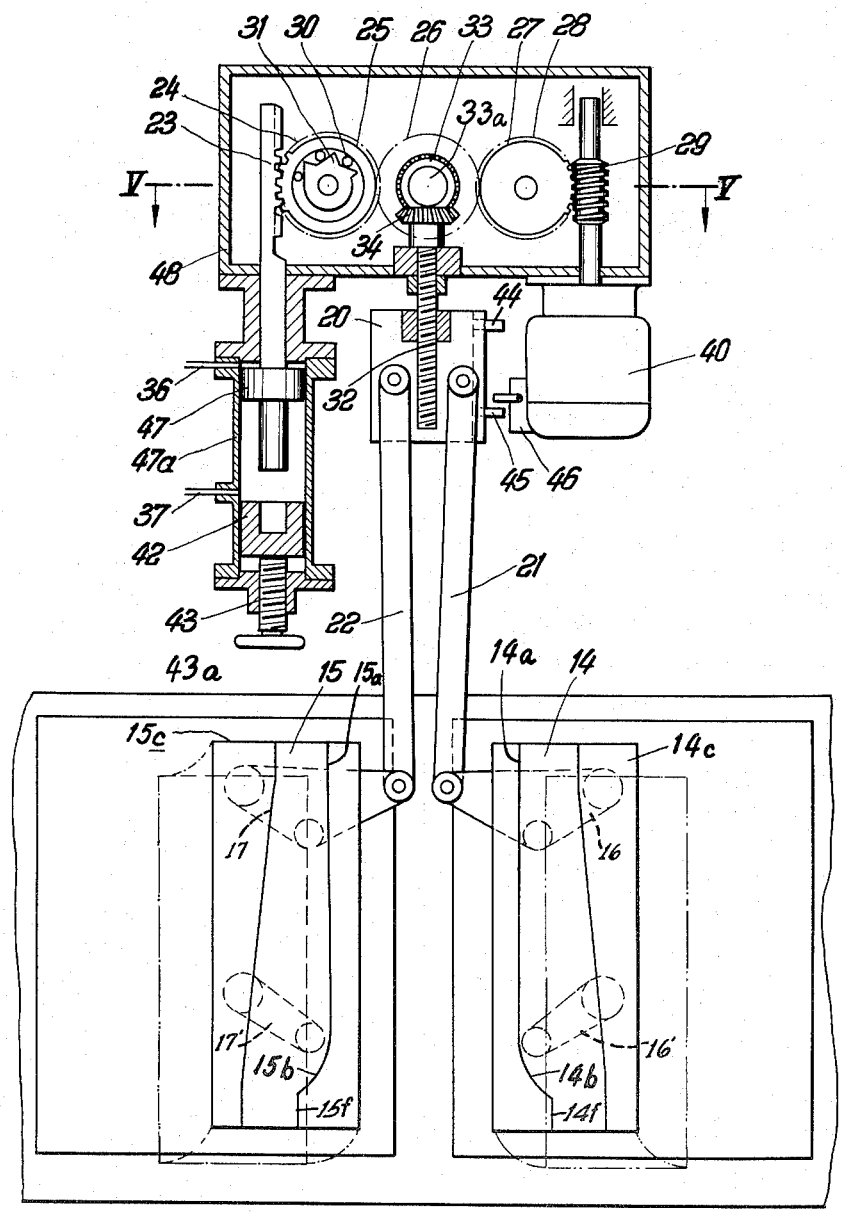
FIG. 4 is an elevation view on the line IV—IV of FIG. 5 and represents an elevation partially in section showing the details of the template control mechanism.

The links 16 and 17, also serving as bell crank levers, are pivotally coupled via their eyes 16" and 17" to actuator bars 21 and 22, respectively, at the lower ends of the bars, as shown in FIGS. 3 and 4. The upper ends of the bars have pivotal connection with a vertical reciprocal block 20 provided with a nut or threaded portion for coaction with a screw 32, rotation of which effects upward or downward movement of block 20 and thus translational movement of templates 14 and 15 from the phantom line positions shown to the solid line positions, as seen on FIG. 4. It will be noted that the templates swing on their respective links, but do not rotate, their motion being translational. The direction of rotation and threading of the screw 32 is in a right-hand sense so that as block 20 is moved upwardly the links of template 14 swing clockwise and those of template 15 swing counter-clockwise. Accordingly, the templates move inwardly toward each other, but to a decreasing translational degree as the links approach horizontal position, thus increasing the cumulative depth of cut with each traverse, by control of cutters as hereinafter explained, the horizontal or transverse component of movement being, however, progressively less with each cut.

Referring now to FIGS. 3, 4 and 5, a gear housing 48 is shown carried on plate 49 and from which the screw 32 depends. The screw keys to a bevel gear 34 meshing with a bevel gear 33 on a shaft 33a which carries a gear 26 keyed thereto so that rotation of gear 26 in one direction or the other will cause block 20 to move upwardly or downwardly. Downward movement actuates the templates to the next succeeding cut position, after each cutting stroke, a hydraulic cylinder 47a being carried by gear housing 48 for this purpose, having reversible piston 47. Piston 47 rises to move its connected gear rack 23 upwardly, rotating a gear 24 on shaft 24a and having an internal one-way clutch comprising the cam wheel 31 and rollers 30. The cam wheel 31 is keyed to the shaft 24a which carries an electromagnetic multiple disc clutch 35 for connecting a gear 25 to the shaft, all as seen in FIG. 5, gear 25 meshing with gear 26. Accordingly, when gear rack 23 rises, gear 25 is rotated to thus rotate gear 26 and operate block 20 upwardly provided clutch 35 is energized. This occurs at the end of each cutting stroke.

Figure 8:
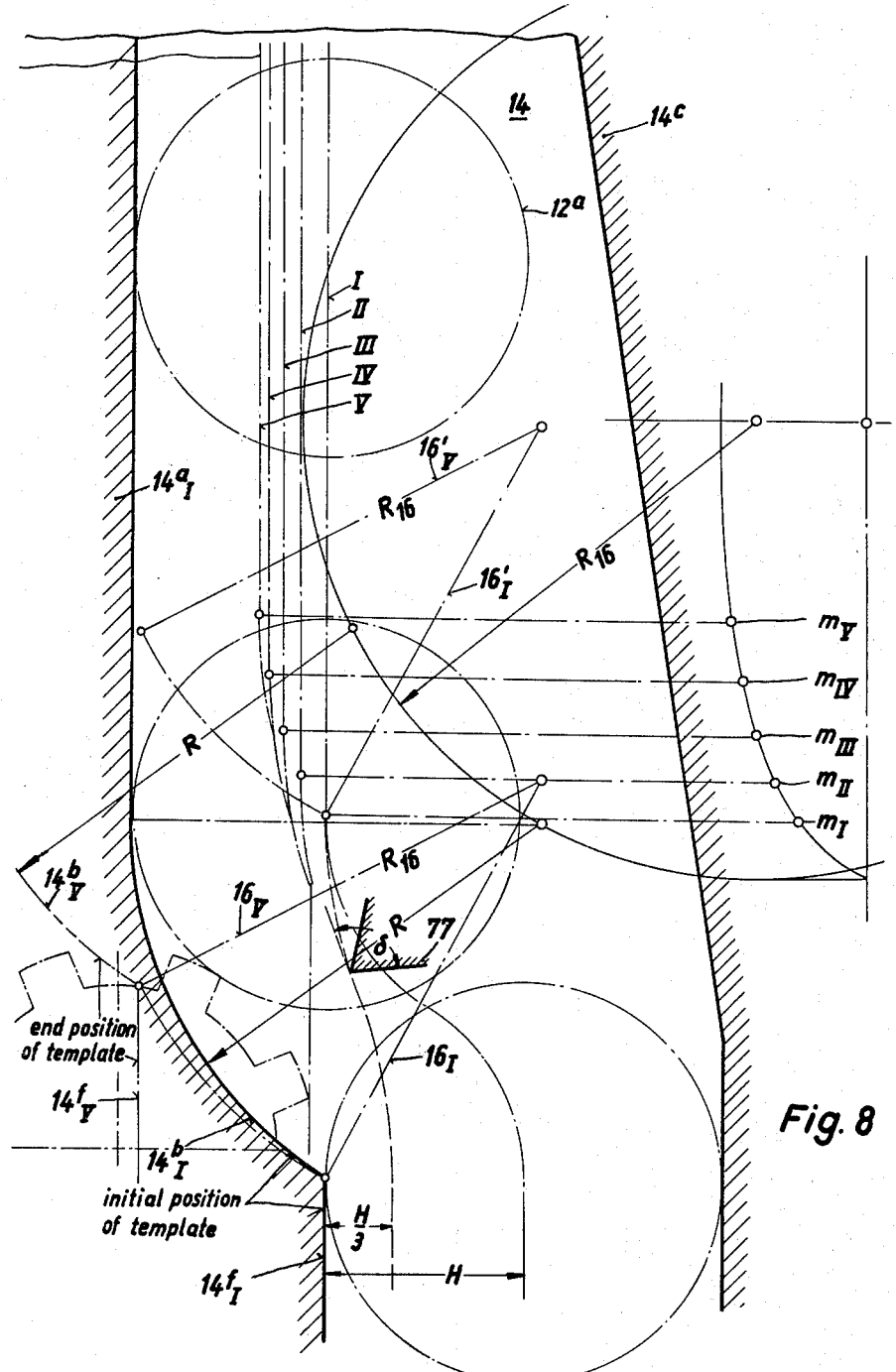
FIG. 8 is a graphical elevational schematic showing in a composite manner the geometric relationship of the template, the follower, the work, and cutter depth during the course of several strokes.

On the down stroke of gear rack 23, which occurs during each cut, the cam wheel 31 slips and no rotation is given to gear 26 by the downward movement of piston 47, block 20 remaining stationary. Accordingly, with each upward stroke of gear rack 23, screw 32 is turned a sufficient degree to move the templates toward each other equivalent to the thickness of the next chip or shaving to be cut, such thickness decreasing with each cut, as illustrated in FIG. 8, by the spacing between lines I, II, III, IV, V, to be later discussed. A successive series of reciprocal movements of gear 23 ultimately brings the templates in from their initial phantom line positions (FIG. 4) to the final full line positions, corresponding to full cutting depth, as effected by the follower rollers 12a and 13a acting in simultaneous control of all the cutters 77 in a manner to be hereinafter described.

The thickness of each shaving can be regulated by means of a stop element 42 in cylinder 47a, set to a desired position within the cylinder by a screw 43 operated by a hand-wheel 43a (FIG. 4). Thus, piston 47 can move downwardly only to the extent determined by the position of the stop element 42 and its extent of upward rise is thus controlled for predetermining shaving thickness.

After a slot has been fully cut, the block 20 is brought back to initial position by means of an electric motor 40 acting through a worm 29 (FIG. 5) engaging worm gear 28 carried on shaft 28a with a gear 27 that meshes with gear 26. An electromagnetic multiple disc clutch 41, the same kind or similar to clutch 35, can couple gear 27 to the shaft 28a, whence energization of the motor 40 effects opposite rotation of the screw spindle 32 to bring block 20 down to initial position for cutting another workpiece. Motor 40 is carried by housing 48 and is controlled by a switch 46 engaged by fingers 44 and 45 carried by block 20 at upper and lower limits of movement of that block.

The pistons 10h and 47 (FIG. 2) move in unison in the same direction; oil conduits 36 and 39 are interconnected, and conduits 37 and 38 are also interconnected, in a manner well understood. Accordingly, the hydraulic drives for the cutter head 10 and the templates are synchronized thereby, the cutter head 10 moving downwardly to effect a shaving while the templates are stationary; the templates moving inwardly at the end of each shaving movement of head 10 while the head is moving up. The follower rollers determine the exact paths of the cutters 77 which have a horizontal component at the end of each shaving movement as effected by the curved portions 14b and 15b of guides 14a and 15a (FIG. 3).

Figure 6:
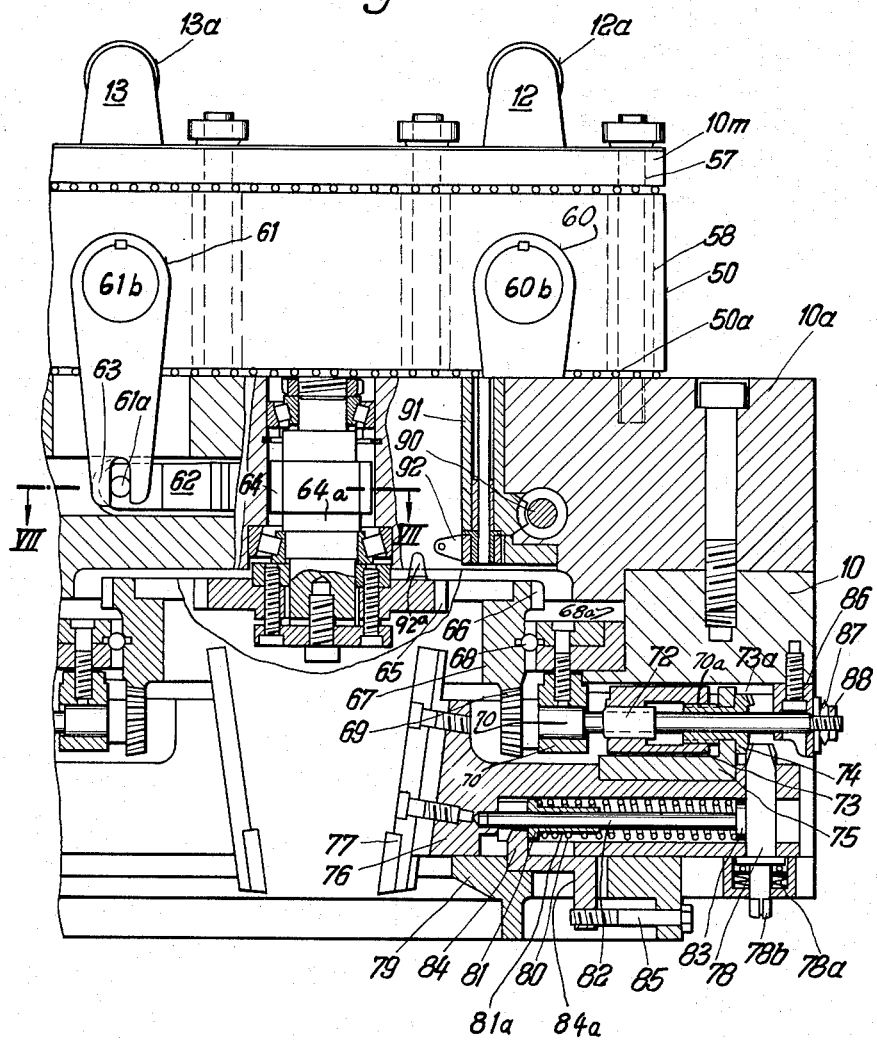
FIG. 6 is an amplified elevation partially in section showing details of the planer head structure and the template control structure and being viewed in the same direction as FIG. 3.
Figure 7:
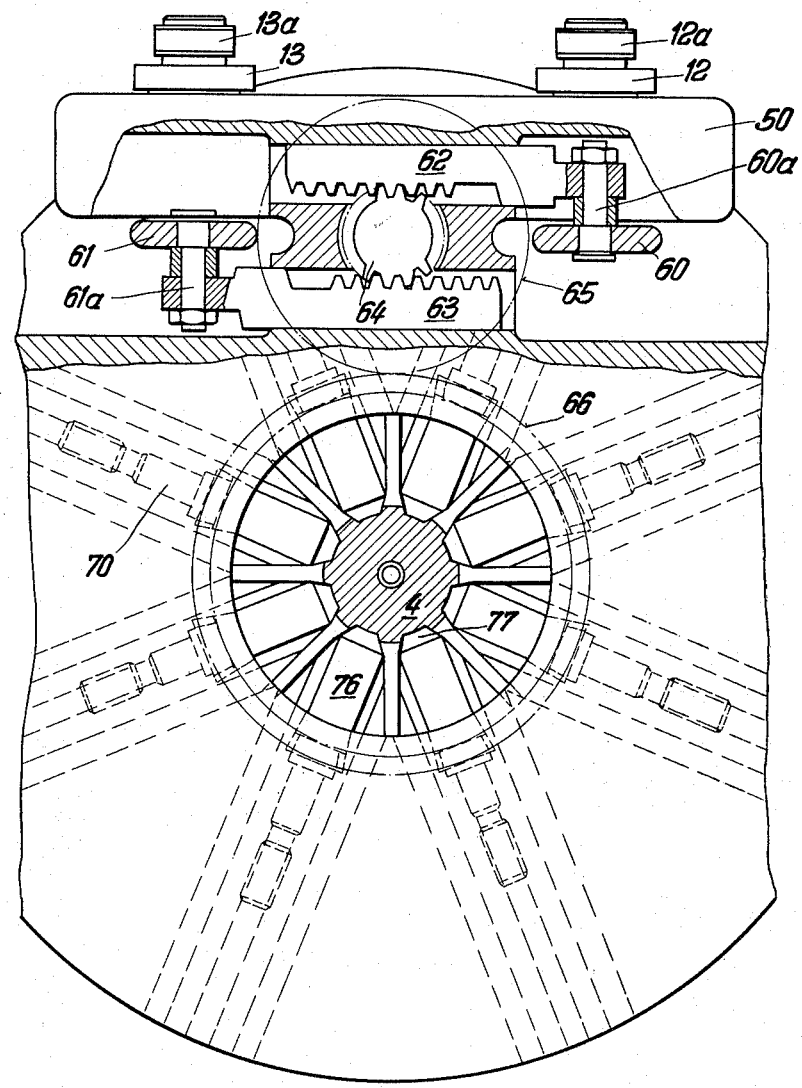
FIG. 7 is a plan section through VII—VII of FIG. 6 showing details of the template follower mechanism.

The follower rollers 12a and 13a are disposed between the guides of each template, as shown on FIGS. 5, 6 and 7. They are rotatively carried on the feeler levers 12 and 13 which have rotative support in the transversely slidable block 50, at one side thereof, being keyed coaxially therethrough with fork levers 60 and 61 (FIGS. 5, 6, 7, respectively), being understood to be on the same shafts 60b and 61b with the respective levers.

The lateral shiftability of block 50 which carries the feeler levers effects a self-adjustment so that the follower rollers always engage the template.

As seen in FIGS. 6 and 7, the levers 60 and 61 have slotted ends straddling respective pins 60a and 61a integral with respective racks 62 and 63. The racks mesh with a pinion 64 keyed to a shaft 64a on which is keyed a gear 65.

With particular reference to FIGS. 5 and 6, gear 65 meshes with teeth 66 of a gear 67 rotatively carried by means of spaced ball bearings 68 in a composite ring 68a secured to cutter head 10. There may be four such balls 68 provided so that the gear 67 can rotate smoothly with respect to the cutter head. The longitudinal edge of gear 67 is provided with bevel teeth to mesh with a bevel gear 69 carried on a shaft 70 suspended between end bearings 71 and 86 which are carried by the composite ring 68a and the cutter head, respectively. It will be understood that each cutter 77 is associated with a respective bevel pinion 69 and the follower action of rollers 12a and 13a effects rotation of all such bevel pinions 69 via feeler levers 12 and 13, racks 62, 63, gears 65, 67.

Rotation of the several pinions 69 effects radial movement of respective cutting tool holders 76, as hereinafter described, all cutters being thus radially moved simultaneously in accordance with template contour.

Each tool 77 is carried securely in a radially slidable holder 76 in turn slidably mounted and supported in a base plate ring 79 non-rotatively secured to the bottom of head 10. Fine adjustment of each cutter is provided for by means of a respective manually adjustable spindle 78 which is carried in aligned bores in the respective tool holder 76 and which has an outer wrench accommodating head 78b to effect rotation thereof. The inner end of each spindle is provided with bevel teeth to mesh with a respective bevel pinion 74 concentric with the respective pinion shaft 70 and being rotative and slidable with respect thereto. Each pinion 74 is rotatively secured within a bearing block 75 keyed as by spline 73a to the cutter head and having a bore for a recess of the pinion hub, as shown. The extended hub of pinion 74 is threaded as by a left-hand thread 70a within a nut sleeve 73 which carries pinion 74, and a coarse threaded enlarged portion 72 of shaft 70 likewise is threaded within the sleeve 73.

Sleeve 73 is likewise non-rotatively splined by spline 73a to the cutter head, but is slidable radially with rotation of shaft 70 by virtue of threaded portion 72, carrying pinion 74 along with it as well as bearing 75.

Thus, for initial adjustment of cutters 77 toward the workpiece, rotation of spindles 78 will effect rotation of the respective pinions 74 to move them radially by virtue of the threading 70a whereby the bearing collars 75 will be shifted radially to shift the respective tool holders 76. This adjustment affords very precise positioning of the cutters at the beginning of a cut.

In a somewhat similar manner, radial movement of the cutters under template follower control is effected by simultaneous rotation of the several pinions 69 which, acting via shafts 70 and threaded portions 72, shift sleeves 73 radially which carry pinions 74, the respective bearing collars 75 to shift tool holders 76.

In order to maintain shaft 70 against unintended rotation, flexible disc washers 87 compressed by a nut 88 are provided on a threaded portion at the end of the shaft. For a similar purpose with respect to spindle 78, spring washers 78a are utilized.

In order to maintain securely held successive positions of the cutter holders 76, there is provided, internally of each, a bolt 82 having a head 83 bearing against the respective spindle 78 and biased thereagainst by a pre-compressed spring 80 concentric with the bolt and having bearing support against radial flange 81 of a sleeve 81a, which flange bears against a radial flange 84 of a Z-shaped member 84a secured by a bolt 85 to the base ring 79 and extending upwardly through a slot thereof and also through a slot of the tool holder, as shown, in order to engage flange 81. Thus, the compression in spring 80 aids the disc washers 78a in preventing unintended rotation of spindle 78 and also, by pressure on spindle 78, bearing 75 and sleeve 73, keeps a steady pressure on the tool holder 76 in all positions thereof, thus eliminating play and increasing locking effect in thread 72, 73.

The followers 12a, 13a are thus maintained against guides 14a, 15a, respectively.

From the above description, it will be apparent that each entire sub-assembly comprising the tool 77, the tool holder 76, the bolt 82, the spindle 78, the bearing 75, and the pinion 74 move in unison and this is effected by rotation of shaft 70, either for precise adjustment or horizontal cutter movement under template control. Thus, under template control after each shaving has been cut, shafts 70 are rotated by a small increment in response to upward movement of rack 23 (FIG. 4) to move the templates in radially for the next shaving.

In order to effect control of the machine, any suitable electrical circuitry can be provided. The actual circuitry does not form part of the present invention and can take any desired form within the knowledge of persons skilled in the art.

In the present invention, referring to FIG. 6, a ring 91 is shown carried by plate 10a and such ring carries an electrical contact 92 insulated from the remainder of the machine. Ring 91 can be rotatively adjusted by a suitable worm gear 90 in order to angularly space contact 92 from a contact 92a carried on gear 67 so that at the completion of cutting, when the cutters are at the bottom of the groove, and gear 67 has thus rotated to its predetermined full extent, the electrical contacts will engage each other to energize a relay controlling a switch to shut off the machine. Suitable relays and solenoid switches, etc. as contemplated for control are not shown, but any conventional arrangement can be used. Accordingly, worm gear 90 is used to predetermine the depth of groove to be cut and very precise adjustment of contact spacing for contacts 92, 92a can be had thereby. As a further means of control, the fingers 44 and 45 (FIG. 4) can be spaced for any desired degree of cutting depth, the finger 45 serving to turn on the template reversing motor 40 at the end of a cut, as block 20 reaches its uppermost position and the finger 44 serving to shut off the motor 40 when block 20 has thus been moved down to its starting position on screw 32. It will be understood that the moving contact 92 dominates the control circuitry which includes controls for the electromagnetic clutches 35 and 41 wherein clutch 35 may be energized at all times but is de-energized when manual adjustment is being made and clutch 41 also de-energized when manual adjustment is being made and is also energized at such times as the motor 40 is energized.

Fully automatic control for continuous operation can be provided by any arrangement of limit switches acting through suitable relays and solenoid-operated valves for controlling the forward and reverse movement of the cutter head and movement of rack 23 therewith. The work feed can also be made automatic with the use of known methods and components; for example, as in automatic screw machines where the work is fed in long lengths through the headstock. Thus, any combination of control components may be used, as indicated above, to obtain any degree of automaticity desired. However, for purposes of the present disclosure, it is believed sufficient to show and describe the contacts 92, 92a for effecting shut down at the completion of full cutting of a groove, and switch 46 for effecting starting and stopping of motor 40, with adjustable spacing of 44, 45.

The main movement of the cutters 77 is vertically linear, as provided for by the oppositely oriented template guides with a final gradual curving cut effected by the oppositely oriented template guide sections 14b and 15b where a horizontal component backing the cutters out of the groove is effected. The shaving cut during the course of horizontal backing out has not been found to have any serious effect on the cutter edges in actual practice and it occurs only for a relatively short shaving compared to the linear shaving taken in the course of the main cut.

Referring now to FIG. 8, there is illustrated therein the geometric relationship of the follower roller 12a and its associated template guide 14a together with the associated cutter 77. It will be understood that all comments made hereinafter also refer to the action of template 15, since both templates exert the same control on the cutters 77 in a mechanically balanced arrangement by acting through racks on opposite sides of the gear 64.

In FIG. 8, the Roman numerals I through V designate the successive paths, in consecutive order, of the cutting point 77. The linear portion of the path is designated with the reference numeral $14a_I$ which merges into arcuate portion $14b_I$ to control the curved emergence of the cutter at the end of the groove. The follower roller $12a$ thus rolls along the path engaging the edge of the template guide $14a$ for each successive movement of the template, moving radially inwardly as illustrated in degree of horizonal component by the spacing between the lines designated by I through V. The dot-dash curve passing through the centers of the several designated positions of roller $12a$ will be noted as being at a radial distance H from the edges $14f$, $14b$ and $14a$. On the other hand, the cutter point will be noted as being at a horizontal distance $H/3$ on the dashed line representing the cutting line. Thus, the horizontal component of motion between the roller and the cutter is by way of example in the ratio of 1:3. This is, of course, due to the predetermined dimensioning of the feeler levers and gearing involved in the mechanism. The starting positions of the links 16 and 16' having the radius $R_{16}$ are shown at $16_I$ and $16'_I$, the end positions being shown at $16_V$ and $16'_V$. The dot-dash line, $14b_V$, $14f_V$ shows the final position of the template at completion of the groove cutting, it being understood that the template 14 moves toward the left, as seen in FIG. 8, which is in effect radially inward toward the work, as seen in FIG. 4.

By comparing the successive paths of cutter 77 indicated by the lines I through V, it will be clear that the thickness of shaving progressively decreases as the bottom of the groove is reached, the bottom being indicated by the line V. Also, it will be noted that by reference to the points designated as $m_{I-V}$ representing the center points of the arc-like paths of cutter 77, that shaving thickness reduces with each traverse of the cutter. This is, of course, assured by the arrangement of angularity of the links which, obviously, have their end points traversing less horizontal distance as the links move toward a horizontal plane.

Operation

In commencing use of the machine a workpiece is inserted between the headstock and tailstock by means of the adjustability of the carrier 5; the templates 14 and 15 having the cut control edges $14a$ and $15a$ are then adjusted by means of hand-wheel 55 to bring the cutters up to the work; the screw 43 is adjusted for desired thickness of shaving and the worm gear 90 is adjusted to angular space contacts 92 and $92a$ to predetermine the desired full depth of cutting. Spindles 78 are adjusted to precisely position the cutters with respect to the work, this being a fine adjustment relative to what might be considered coarse adjustment as effected by hand-wheel 55. Fingers 44 and 45 are adjusted for starting and stopping motor 40 at the end of a full depth cut.

At this time the cutter head 10 is in raised position as is rack 23. The first two or three strokes of the cutter head may not effect actual shaving, depending upon the precision of actual tool adjustment with respect to the work.

After all adjustments have been made, as described above although not necessarily in the sequence given, power is turned on, meaning that a force pump (not shown) for feeding the double ended cylinders $10i$ and 47 is put in operation and which, through suitable solenoid multi-valve control, actuates the respective pistons. The cutter head thus moves downward to cut a shaving while the block 20 remains stationary, inasmuch as rack 23 is moving downward and effects no drive due to slippage of the one-way clutch. The follower rollers $12a$ and $13a$ have been placed in position by edges $14c$ and $15c$ and are maintained against the edges $14a$, $14b$, $14f$ and $15a$, $15b$, $15f$ by virtue of automatic lock of thread 72, 73 and follow those edges as the cutter head moves down carrying the feeler levers 12 and 13, at the end of which are carried the rollers. The action of the feeler levers has straight guiding effect on the main portion of movement of the cutters 77 which move vertically downward until the follower rollers engage the curved sections $14b$ and $15b$ which effects gradual backing out of the cutter tools from the cut in the workpiece leaving an outwardly curving terminus. In FIG. 8 the space between two adjacent cutting paths I-II, II-III, etc. represents the cuneiform ends of the chips, and it is to be seen that the tool 77 on each stroke cuts only a part of the curved termination of the spline groove. So, the smaller cutting angle $\delta$ between work and tool occurring on the curved termination does not bring about any serious shortening of the life of the cutters.

At the end of each shaving movement of the cutter head, the cutter head is returned to upper position, e.g., by limit switch (not shown) control, for the next shaving, and simultaneously with the upward movement of the cutter head, rack 23 rises to drive screw 32 via the gearing, raising block 20 a small increment to move the templates radially inwardly by a corresponding increment. The cutter head then goes down once more for the next shaving as guided by the templates. This cycle is repeated until full depth of cut is reached; the block 20 is now in maximum raised position and the contacts 92 and $92a$ engage which effects shut-off of the machine and switch 46 is turned on to energize motor 40 by finger 45 acting on switch 46 to reverse the movement of block 20 and bring it down to its lowermost or starting position, moving the templates away from each other ready for the next cut. When finger 44 engages switch 46, motor 40 is shut off and the templates are in initial position. The workpiece is then removed and a new one inserted.

Having thus described my invention, I am aware that various changes may be made without departing from the spirit thereof and, therefore, do not seek to be limited to the precise illustrations herein given, except as set forth in the appended claims.

I claim:

1. In a machine of the class described, a cutter head, cutter holders carried thereby, template means and means connecting said template means with said cutter holders to move said holders transversely of the direction of movement of said cutter head during the course of cutting, said template means comprising a pair of coplanar templates having oppositely oriented cut control edges to be followed, each of said templates being carried by a parallel linkage pivoted to a respective support plate, and means for adjustably mounting said plates to initially space said templates with respect to each other, said linkage support plates for said templates being disposed so that said templates may be translated thereby, after a cutting movement of said head, into position for controlling said holders for succeeding cutting movement with progressively decreasing the shaving thickness.

2. In a machine as set forth in claim 1, said templates having additional edges for guiding said follower means into control engagement with said cut control edges.

3. In a machine of the class described, a cutter head for carrying cutter holder means, means for effecting traverse of said head lengthwise of a workpiece during cutting thereof comprising a pressure operated piston, means mounting said holder means for support by said head so as to have movement in a path transverse to said workpiece, template means for controlling movement of said holder means to follow a predetermined path having straight and curved portions, follower means coacting with said template means, actuating means coupling said follower means with said holders for effecting movement of said holder means in said predetermined path, and means for shifting said template means after each successive traverse of said head comprising a pressure operated piston, and a slip clutch drive means connecting said latter piston with said template means whereby said template means remains stationary when said latter piston is moving while cutting is being effected by said first mentioned piston, and means whereby said pistons are operated simultaneously wherein said template means is shifted in readiness to control each succeeding cut while said cutter head is being moved into position to take each said cut.

4. In a machine as set forth in claim 3, said template means comprising a pair of templates having oppositely oriented edges to simultaneously control movement of respective follower means so that substantially identical actuating effort is transmitted to said actuating means to actuate said holder means, said actuating means comprising racks actuated by said follower means, and comprising a pinion operated by said racks by engagement simultaneously on two sides thereof, and further comprising means simultaneously actuated by said pinion for transversely moving said holder means.

5. In a machine as set forth in claim 4, said templates being coplanar and said follower means comprising a respective feeler lever for each template, said cutter head carrying said feeler levers.

6. In a machine of the class described, a reciprocal cutter head for carrying a plurality of cutter holders along a workpiece during a cut traverse, template means and actuating means therefor comprising a screw rotative in one direction for effecting translational motion thereof for effecting movement of said holders in a direction toward said workpiece with each succeeding shaving up to full depth cut, follower means carried by said support means and coacting with said template means for moving said holders in a predetermined path under the control of said template means, and means for returning said template means to initial position at the end of full depth of cut by reverse rotation of said screw, and means whereby operation of said screw in said one direction is synchronized with return movements of said cutter head between successive shavings up to full depth cut.

7. In a machine of the class described, a cutter head, means comprising a hydraulic cylinder for effecting reciprocal movement thereof, cutter holders carried thereby, template means and means connecting said template means with said cutter holders to move said holders transversely of the direction of movement of said cutter head during the course of cutting, said template means comprising a pair of coplanar template elements having oppositely oriented edges to be followed, said template means being supported by actuatable link means, said link means being disposed so that said template means may be translated in one direction thereby after a cutting movement of said head into position for controlling said holders for succeeding cutting movement with progressively decreasing shaving thickness, and mechanism for actuating said link means comprising a hydraulic cylinder for movement in said one direction synchronized with operation of said first-mentioned hydraulic cylinder between successive shaving movements of said head, and an electric motor for effecting reverse actuation of said link means after full depth cut.

8. In a machine of the class described, movable support means for supporting cutter means for movement relative to a workpiece during cutting thereof, cuttter means comprising a plurality of tool holders carried by said support means and mounted for individual movement in respective paths transversely of said workpiece during cutting, template means for controlling movement of said holders to follow respective transverse paths, follower means coacting with said template means, and actuating means coupling said follower means with said holders for effecting movement of said holders in said transverse paths, said actuating means comprising a gear and means for rotation thereof by said follower means and further comprising a pinion disposed at each holder, each of said pinions having threaded connection with a respective translatory nut, and means connecting said nut to the respective holder for effecting transverse path movement thereof upon rotation of the respective pinion, wherein said gear simultaneously rotates all said pinions to simultaneously move all said holders.

9. In a machine of the class described, a frame and means supported thereby for guiding a cutter head in reciprocal motion, a cutter head and a plurality of cutter holders carried thereby in radial array and mounted therein for motion in a respective radial direction transverse to the path of reciprocal motion of said cutter head, template means carried by said frame, a follower means engageable with said template means, means coupling said follower means to said holders for effecting transverse movement relative to said path of said cutter head, and a bearing member carried on said cutter head and mounted for transverse movement thereon relative to said path, said follower means being pivotally carried by said member.

10. In a machine as set forth in claim 9, a hydraulic cylinder carried by said frame for driving said cutter head and being connected thereto by spaced rods, and a workpiece support means carried by said frame and disposed intermediate said rods.

11. In a machine of the class described, a frame and means supported thereby for guiding a cutter head in reciprocal motion, a cutter head and a plurality of cutter holders carried thereby and mounted therein for motion in a direction transverse to the reciprocal motion of said cutter head, template means carried by said frame, follower means carried by said cutter head, means coupling said follower means to said holder means for effecting transverse movement thereof with succeeding shaving cut movements of said cutter head, and means for effecting movement of said template means in reverse directions comprising rotary shafts and respective drives therefor and electromagnetic clutch means for connecting either shaft to said template means for movement in a respective direction.

12. In a machine of the class described, reciprocal support means for carrying a plurality of cutter holders along a workpiece during a cut traverse, template means and template actuating means connected to said template means for effecting translational motion thereof in a direction toward said workpiece, said template actuating means comprising parallel link suspension means disposed for pivotal movement to translate said template means to successive predetermined positions for controlling cutting depth in each succeeding cut, follower means carried by said support means coupled with said holders and coacting with said template means for moving said holders in a predetermined path under the control of said template means, said parallel link suspension means comprising a bell crank lever, and a drive means connected thereto.

13. In a machine of the class described, movable support means for supporting cutter means for movement relative to a workpiece during cutting thereof, cutter means comprising a plurality of tool holders carried by said support means and mounted for individual movement in respective paths transversely of said workpiece during cutting, template means for controlling movement of said holders to follow respective transverse paths, follower means coacting with said template means, and actuating means coupling said follower means with said holders for effecting movement of said holders in said transverse paths, said actuating means comprising a gear and means for rotation thereof by said follower means and further comprising a pinion disposed at each holder, each of said pinions having threaded connection with a respective translatory nut, and means connecting said nut to the respective holder for effecting transverse path movement thereof upon rotation of the respective pinion, wherein said gear simultaneously rotates all said pinions to simultaneously move all said holders, and respective manually adjustable means operative upon each translatory nut for effecting an initial adjustment of the respective cutter.

14. In a machine of the class described, movable support means for supporting cutter means for movement relative to a workpiece during cutting thereof, cutter means comprising a plurality of tool holders carried by said support means and mounted for individual movement in respective paths transversely of said workpiece during cutting, template means for controlling movement of said holders to follow respective transverse paths, follower means coacting with said template means, and actuating means coupling said follower means with said holders for effecting movement of said holders in said transverse paths, said actuating means comprising a gear and means for rotation thereof by said follower means and further comprising a pinion disposed at each holder, each of said pinions having threaded connection with a respective translatory nut, and means connecting said nut to the respective holder for effecting transverse path movement thereof upon rotation of the respective pinion, wherein said gear simultaneously rotates all said pinions to simultaneously move all said holders, and a spring associated with each holder through which force is transmitted from said template means.

15. In a machine of the class described, means comprising a cutter holder movable in the longitudinal direction of a cut to be taken in a workpiece and also movable simultaneously in a path transverse thereto so as to cut a curve outwardly from the bottom of a longitudinal cut at an end of said cut, template means having a portion with a corresponding curve to impart a transverse movement component to said holder and means for coupling said template means to said holder for achieving said transverse movement, actuating means for effecting a successive series of cutting traverses of said holder and comprising a device to increase the cumulative depth of cut with each traverse to a lesser degree with each cut, said device comprising means operative on said template means for successively decreasing the length of longitudinal traverse of said holder as the depth of cutting progresses so as to substantially avoid successive cutting on previously cut portions of said curve in said workpiece.

16. In a machine as set forth in claim 15, said template means comprising a movable member, said device comprising a pivotal guide linkage connected to said member and means for moving said member in said longitudinal direction at the termination of each cutting traverse, whereby translation of said member with longitudinal and transverse components is effected by said linkage, between successive cuts, wherein the transverse depth of each succeeding cut is directly proportional to the extent of the respective previous transverse component, and the longitudinal component of each said translation providing a shorter longitudinal traverse of said holder for the next cut, wherein a succession of movements of said holder are related along the workpiece curve so as to effect a series of substantially smoothly joined arcuate cuts to achieve said curve, the changing angle of said linkage relative to said member being operative to decrease the thickness of successive cuts.

17. In a machine of the class described, cutter holder means and a support means therefor movable in a path in the direction of cut to be taken in a workpiece and simultaneously in a path transverse thereto, wherein said cut is to have a curve outwardly from the bottom thereof at an end thereof, template means having an edge contoured to impart a transverse component of movement to said holder means, and means for coupling said template means to said holder means for transmitting said transverse movement component thereto to effect cutting of said curve, means for effecting a successive series of cutting transverses of said holder means and comprising elements to increase the cumulative depth of cut with each traverse, and means for successively decreasing the length of traverse of said holder means moving in said path at predetermined points along said curve as the depth of cutting progresses so as to substantially avoid successive cutting on previously cut portions of said curve.

18. In a machine of the class described, means comprising a plurality of cutter holders in radial array and means whereby said holders are simultaneously movable in the longitudinal direction of respective cuts to be taken in a workpiece and also simultaneously radially movable so as to cut curves outwardly from the bottom of longitudinal cuts at ends thereof, template means movable in said longitudinal direction and having an edge contoured with a curve to effect a radial component of movement of said holders and means for coupling said template means to said holders for transmitting said radial movement component thereto to effect the cutting of said curves corresponding to the curve of said contoured edge, actuating means for effecting a successive series of cutting traverses of said holders and comprising a device to longitudinally move said template means, said device comprising means operative on said template means for successively decreasing the length of traverse of said holders with cumulative longitudinal movement of said template means so as to substantially avoid successive cutting on previously cut portions of said curves in said workpiece, and guide means comprising parallel link means connected to said template means and initially disposed at a predetermined angle relative to the longitudinal direction of movement thereof wherein cumulative longitudinal movement thereof progressively changes the angle so that succeeding longitudinal movements of said template means effects progressively smaller radial components of movement of said holders, thereby tending to equalize the force required for effecting the longitudinal cutting movement thereof.

19. A method of cutting a slot in a workpiece having a curved terminal portion which comprises moving a cutting tool in said workpiece to cut a linear slot in a series of successive cuts, moving said tool to cut a greater depth with each cut but with progressively decreasing depth increment with each cut, moving said tool in a direction outwardly of said slot along a curved path at the end of each cutting traverse and progressively shortening each traverse to thus cut a series of arcs joining each other end to end to form a composite curved terminal portion for said slot.

References Cited by the Examiner
UNITED STATES PATENTS

| | | | |
|---|---|---|---|
| 865,188 | 9/07 | Kunze | 90—24.3 X |
| 1,143,498 | 6/15 | Buck | 90—2 |
| 2,237,760 | 4/41 | La Pointe | 90—10 |
| 2,346,867 | 4/44 | Pelphrey | 90—10 |
| 2,374,901 | 5/45 | Sneed | 90—10 |
| 2,469,310 | 5/49 | Pelphrey et al. | 90—10 |
| 2,841,052 | 7/58 | Lucy | 90—24.3 X |
| 2,916,973 | 12/59 | Barton | 90—24.3 X |

WILLIAM W. DYER, Jr., *Primary Examiner*